US010943021B2

(12) United States Patent
Siddiqui

(10) Patent No.: US 10,943,021 B2
(45) Date of Patent: *Mar. 9, 2021

(54) METHODS AND SYSTEMS FOR FACILITATING JOINT SUBMISSIONS

(71) Applicant: Capital One Services, LLC, McLean, VA (US)

(72) Inventor: Afraz Siddiqui, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,800

(22) Filed: Oct. 11, 2019

(65) Prior Publication Data

US 2021/0034768 A1 Feb. 4, 2021

Related U.S. Application Data

(63) Continuation of application No. 16/529,385, filed on Aug. 1, 2019, now Pat. No. 10,496,835.

(51) Int. Cl.
| | |
|---|---|
| *H04L 29/06* | (2006.01) |
| *G06F 21/00* | (2013.01) |
| *G06F 21/60* | (2013.01) |
| *G06K 7/14* | (2006.01) |
| *G06F 13/10* | (2006.01) |
| *G06K 19/06* | (2006.01) |

(52) U.S. Cl.
CPC ............ *G06F 21/606* (2013.01); *G06F 13/10* (2013.01); *G06K 7/1417* (2013.01); *G06K 19/06037* (2013.01); *G06F 2213/3854* (2013.01)

(58) Field of Classification Search
CPC .................. G06F 21/606; G06F 13/10; G06F 2213/3854; G06K 19/06037; G06K 7/1417
See application file for complete search history.

(56) References Cited

U.S. PATENT DOCUMENTS 9,774,913 B1* 9/2017 Thomas ............. H04N 21/4668
2018/0183892 A1* 6/2018 Al Sabawi ............ G06F 3/1454

OTHER PUBLICATIONS

Notice of Allowance issued in U.S. Appl. No. 16/529,385 dated Oct. 10, 2019.

* cited by examiner

*Primary Examiner* — Lisa C Lewis
(74) *Attorney, Agent, or Firm* — Pillsbury Winthrop Shaw Pittman LLP

(57) ABSTRACT

Methods, systems, and devices for facilitating joint submissions. In an example embodiment, a system may facilitate a joint submission from multiple devices. For example, a primary device may receive data for a joint submission with a peripheral device, and the data may be segmented into sensitive and non-sensitive data.

29 Claims, 6 Drawing Sheets

METHODS AND SYSTEMS FOR FACILITATING JOINT SUBMISSIONS

CROSS-REFERENCE TO RELATED APPLICATION

This application is a continuation of and claims priority to U.S. patent application Ser. No. 16/529,385, filed Aug. 1, 2019, which is incorporated by reference in its entirety.

FIELD OF THE INVENTION

The invention relates to facilitating joint submissions.

BACKGROUND

In recent years, the availability and functionality of mobile devices has grown exponentially. However, despite the increase in both the availability and functionality of mobile devices, some tasks are still difficult to perform using mobile technology. In particular, while sharing data through mobile devices has become easier, ensuring the security of that data has become more difficult.

SUMMARY

In some example embodiments, methods, systems, and devices are disclosed herein for facilitating joint submissions in a secure and private manner. Specifically, example methods, systems, and devices innovate by segmenting data into multiple categories and applying different security or privacy protections. As functionality of devices, and in particular mobile technology, advances to allow users more collaborative experiences, a need to provide a more refined approach to protections is needed. This is especially true in instances where sensitive data may need to be transmitted securely and privately from point A to point B, but with intermediate users accessing and/or viewing portions of the data between point A and point B.

In one aspect, a system according to an example embodiment may facilitate joint submissions for multiple devices (e.g., a primary device and a peripheral device). The primary device may receive a first user input initiating a joint submission with the peripheral device. For example, the primary and/or the peripheral devices may constitute mobile devices operated by two users. The primary device may be associated with a user profile for a primary user (e.g., a user account of the primary user) and the peripheral device may be associated with a user profile for a peripheral user (e.g., a user account for the peripheral user). The joint submission may require a first portion of submission data associated with the primary user and a second portion of submission data associated with the peripheral user. For example, the primary user and peripheral user may be collaborating on a project that requires both users to submit sensitive data that they may want to protect from third parties as well as each other.

In response to the first user input, the primary device may generate for display a Quick Response Code (QR code) code. The QR code may act as a first security measure for facilitating the joint submission. This initial security measure can facilitate joint submissions between mobile devices as the QR code can be generated to include specific details about the joint submission and can transfer those details through the use of a QR code scanner on the peripheral device.

In response to the peripheral device interpreting the QR code associated with the joint submission using a QR code scanner, the system can activate a temporary device session between the primary device and the peripheral device based on the QR code. In some embodiments, either the primary or peripheral user may additionally or alternatively input data into their respective devices to activate the temporary device session. For example, in response to interpreting the QR code (or receiving a confirmation that the QR code has been received and/or accepted), the primary and/or peripheral device may query its respective users regarding activating the temporary device session. This query may introduce an additional security measure (e.g., a request for a joint submission or temporary device session password).

While the temporary device session is active, the primary device may receive a second submission package from the peripheral device for combination with a first submission package for the primary device. The second submission package may include peripheral user data included in the required second portion of submission data and the required second portion of submission data may be segmented into sensitive data associated with the peripheral user and non-sensitive data associated with the peripheral user. In some embodiments, the sensitivity of this data may differ depending on the particular user. For example, while data may be required for the joint submission, the peripheral user may not wish to share this data with the primary user. Because of the collaborative nature of the joint submission, it may be necessary for the peripheral user to first share this information with the primary user (or at least the primary device) prior to completion of the joint submission. Because of this, the system may tag the sensitive data in one or more ways to designate for whom this data is sensitive, what device can receive, what device can display, what device may modify, etc. By segmenting the data (or categories of data), and tagging the data (or categories of data) in this manner, the devices may participate in a joint submission while ensuring both the security of the data and privacy of the users to third-parties (whether authorized or unauthorized) and each other. For example, the sensitive data associated with the peripheral user may (e.g., based on the assigned tags) not be viewable by the primary device, but may still be receivable by the primary device (e.g., for incorporation into the joint submission). Likewise, the non-sensitive data associated with the peripheral user may (e.g., based on the assigned tags) both be receivable and viewable by the primary device.

The primary device may then receive primary user data from the primary user. For example, the primary device may receive data inputted by the primary user into a user interface of the primary device and/or may retrieve information about the primary user from a user profile of the primary user. The primary device may then verify that the primary user data includes the required first portion of submission data. For example, in order to facilitate the joint submission in which the receipt of, and/or ability to view, the data may be limited by its sensitivity, the primary device may verify that the primary user data includes the required first portion. Likewise, the peripheral device may verify that the peripheral user data includes the required second portion of submission data. By requiring each device to self-verify, or off-loading this operation to a third party (e.g., a server with access to any sensitive information), both the security and privacy concerns of the primary and peripheral users are met.

The primary device may then generate a first submission package for the primary device. The first submission package may include the required first portion of submission data included in the first data, and the first submission package may be combined (e.g., either at the primary device or at a remote server) with the second submission package to create a joint submission package. The primary device may then submit (or initiate the submission if the joint submission package is already remotely stored) the joint submission package. By combining the first submission package and the second submission package, while maintaining the individual security and privacy of the primary and peripheral users (even from each other), the system has facilitated a more collaborative experience without sacrificing the security or privacy of the users.

In some embodiments, the primary device may generate a notification for the peripheral device that indicates that the second submission package has been received. This notification may include non-sensitive data associated with the primary user and may be transmitted to the peripheral device. Additionally, this notification may end the temporary device session. Alternatively, the temporary device session may be ended by the primary device upon receipt of the second portion of submission data or upon submission of the joint submission package. By ending the temporary device session following the notification, receipt, or submission, any potential security or privacy concern regarding an open device session is ended. If the temporary device session needs to be re-opened (e.g., in order to receive modification to the second submission package from the peripheral device) or a new temporary device session needs to be created, the primary device may generate a new QR code as discussed above. This QR code may contain the same information as the previous QR code and/or additional information that adds or restricts the actions of the temporary device session.

In some embodiments, the primary device may be further configured to aggregate data in corresponding categories of the first submission package and the second submission package. For example, the joint submission may require data entered by the primary and peripheral user to be aggregated. If this data is sensitive (and thus not accessible and/or viewable) by the other user, this operation may not be possible unless the data needed to be aggregated has been previously segmented and/or tagged. Accordingly, the peripheral device (or a remote server) may segment the sensitive data associated with the peripheral user into a first portion of sensitive data associated with the peripheral user and a second portion of sensitive data associated with the peripheral user, in which the first portion of sensitive data associated with the peripheral user is in a category of sensitive data that requires its values to be aggregated with values of sensitive data associated with the primary user in a respective category, and in which the second portion of sensitive data associated with the peripheral user is in a category of sensitive data that does not require its values to be aggregated with values of sensitive data associated with the primary user in a respective category. The primary device may then identify (e.g., based on tags) the first portion of sensitive data associated with the peripheral user and the second portion of sensitive data associated with the peripheral user. In response to identifying sensitive data associated with the peripheral user in the first portion of sensitive data associated with the peripheral user, the primary device (or a remote server) may aggregate a value of the first portion of sensitive data with a value of sensitive data associated with the primary user. By segmenting, tagging, and aggregating in this manner (which does not involve displaying the underlying data), the security and privacy concerns of the users are maintained even in instances where sensitive data requires aggregation.

Various other aspects, features, and advantages will be apparent through the detailed description and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a sub-part of, or the entirety of, a given item (e.g., data) unless the context clearly dictates otherwise.

DETAILED DESCRIPTION OF THE DRAWINGS

In the following description, for the purposes of explanation, numerous specific details are set forth in order to provide an understanding of example embodiments. It will be appreciated, however, by those having skill in the art that embodiments may be practiced without these specific details or with an equivalent arrangement.

Figure 1:
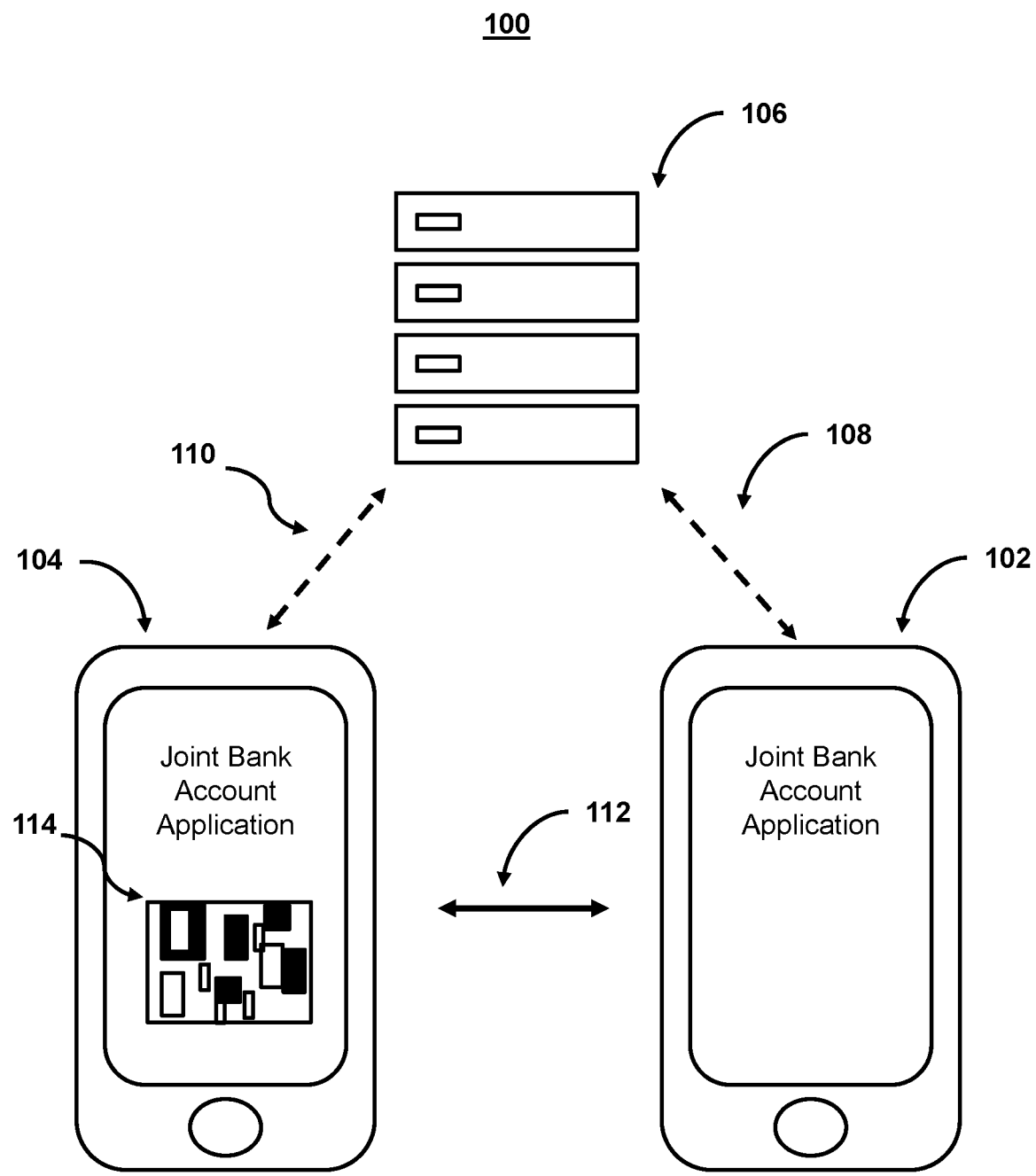
FIG. 1 shows a system for initiating joint submissions in user devices, in accordance with one or more embodiments.

FIG. 1 shows a system for facilitating joint submissions in user devices, in accordance with one or more embodiments. As shown in FIG. 1, system 100 may include primary device 104 and peripheral device 102 (e.g., mobile or other user devices). While shown as smartphones in FIG. 1, it should be noted that primary device 104 and/or peripheral device 102 may be any computing device, including, but not limited to, a personal computer (PC), a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of primary device 104, those operations may, in some embodiments, be performed by components of server 106. In some embodiments, the various computers and systems described herein may include one or more computing devices that are programmed to perform the described functions.

With respect to the components of peripheral device 104, primary device 102, and server 106, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or display for use in receiving and displaying data. For example, as shown in FIG. 1, both primary device 104 and peripheral device 102 include a display upon which to display data. Additionally, as primary device 104 and peripheral device 102 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run a joint submission application (or another suitable program). The application may cause the processors and/or control circuitry to perform operations related to the joint submission. For example, the processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Paths 108 and 110 are drawn with dotted lines to indicate that in the exemplary embodiment shown in FIG. 1, it is a wireless path and path 112 is drawn with a solid line to indicate the presence of a temporary device session. The computing devices may include additional communication paths linking a plurality of hardware, software, and/or firmware components operating together. For example, the computing devices may be implemented by a cloud of computing platforms operating together as the computing devices.

In FIG. 1, system 100 is initiating a joint submission (e.g., the application for a joint bank account) between multiple devices (e.g., primary device 104 and a peripheral device 102). For example, users of primary device 104 and a peripheral device 102 may be collaborating to fill out a joint bank account application. Using primary device 104 and a peripheral device 102, each user may enter information necessary to complete the joint bank account. For example, the primary device may receive a first user input initiating a joint submission with the peripheral device. For example, a primary user that is operating primary device 104 may select a link displayed on primary device 104 that initiates a joint submission of an application for a joint bank account with a peripheral user operating peripheral device 102.

The primary device may be associated with a user profile for a primary user (e.g., a user account of the primary user) and the peripheral device may be associated with a user profile for a peripheral user (e.g., a user account for the peripheral user). The joint submission may require a first portion of submission data associated with the primary user and a second portion of submission data associated with the peripheral user. For example, in order to complete the joint submission (e.g., the joint bank account application), the primary user and peripheral user may need to enter personal information such as name, social security number, annual income, demographic information, etc. Some of this information may be sensitive data. As referred to herein, sensitive data includes data the owner of which does not wish to be publicly disclosed to third-parties and/or to the other user for security and/or privacy reasons. For example, while the peripheral user may not be concerned with disclosing his name to the other user, the peripheral user may be concerned with disclosing his social security or annual income to the other user.

In some embodiments, the categories of data that are considered "sensitive" may be designated by the owner of the data (e.g., the user operating primary device 104 or peripheral device 102), designated by user preference or settings (e.g., as found in a user profile or user account for the user operating primary device 104 or peripheral device 102), designated by a third party (e.g., a service that provides the joint submission platform and/or receives the joint submission), and/or based on predetermined application settings (e.g., the application to which the joint submission is submitted may automatically categorize some information as sensitive). In some embodiments, any data that could potentially identify a specific individual, any information that can be used to distinguish one person from another, and/or any information that can be used for de-anonymizing anonymous data may be considered sensitive.

In response to a first user input (e.g., requesting to begin a joint submission), the primary device may generate for display a Quick Response Code (QR code) such as QR code 114. It should be noted that any alphanumeric, matrix-based, or other code scheme may be suitable. QR code 114 may be converted into a useful form by peripheral device 102. For example, in response to peripheral device 112 scanning QR code 114 on primary device 104, peripheral device 102 can interpret QR code 114 and convert it into instructions for facilitating the joint submission and/or opening a temporary device session. For example, in response to the first user input, primary device 104 may have launched a temporary device session. Peripheral device 102 may convert QR code 114 into a URL that, when accessed, provides instructions, login credentials, access to a downloadable content (e.g., a joint submission application) and/or other information related to the joint submission and/or joining the device session launch by primary device 104.

Upon interpreting QR code 114 with a QR code scanner, peripheral device 102 can activate (e.g., join) the temporary device session primary device 104. In some embodiments, either the primary or peripheral user may additionally or alternatively input data into their respective devices to activate the temporary device session. For example, in response to interpreting the QR code (or receiving a confirmation that the QR code has been received and/or accepted), the primary and/or peripheral device may query its respective users regarding activating the temporary device session. This query may introduce an additional security measure (e.g., a request for a joint submission or temporary device session password).

Figure 2:
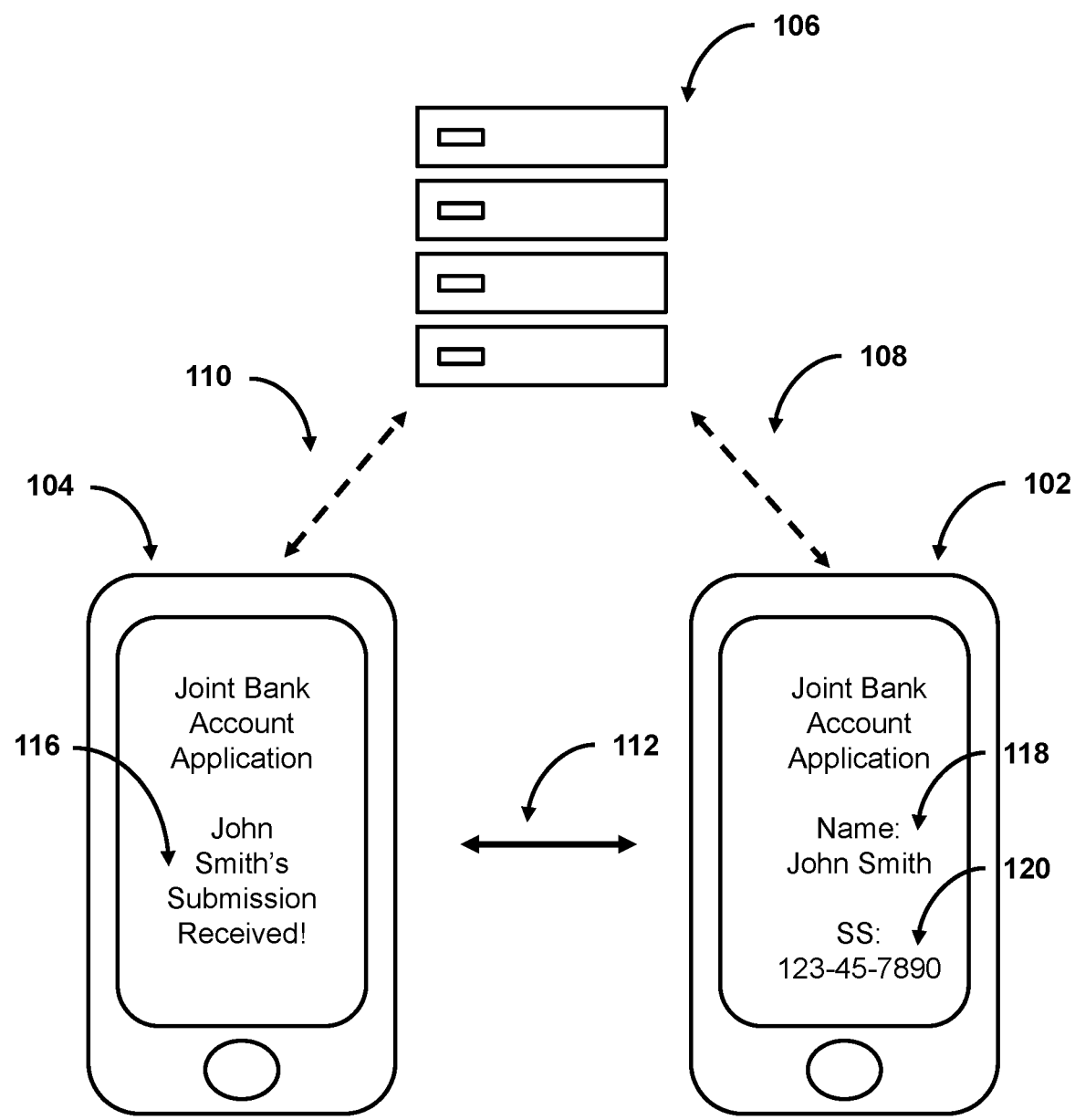
FIG. 2 shows a system for facilitating joint submissions in user devices, in accordance with one or more embodiments.

FIG. 2 shows a system for facilitating joint submissions in user devices, in accordance with one or more embodiments. In particular, system 200 illustrates the state of the system after the temporary device session is active.

For example, while the temporary device session is active, primary device 104 and peripheral device 102 may share information related to the joint submission. For example, primary device 104 may receive a second submission package from peripheral device 102, and primary device 104 may combine the second submission package with a first submission package. Additionally, primary device 104 and peripheral device 102 may gain access to other devices (e.g., server 106). For example, while temporary device session is active, primary device 104 and peripheral device 102 may be able to securely transfer encrypted data (e.g., the respective submission packages and/or other data) between each other and/or server 106. It should be noted that primary device 104, peripheral device 102, and/or server 106 may encrypt data using public key or symmetric key encryption and may use 56-bit or higher encryption.

Furthermore, server 106 may store drafts of the joint submission as data related to the joint submission is received from primary device 104 and peripheral device 102. Server 106 may store the joint submission as a draft, and the draft may be accessible by primary device 104 and peripheral device 102 while the temporary device session remains active. In some embodiments, certain operations may be off-loaded to server 106 (e.g., data verification steps as discussed below).

Additionally or alternatively, while the temporary device session is active, primary device 104 may receive a second submission package from peripheral device 102 for combination with a first submission package for primary device 104. For example, as part of the joint submission, primary device 104 may receive a portion of data (e.g., the portion of the joint submission feature the data from the peripheral user) from peripheral device 102 for incorporation into the joint submission.

For example, the second submission package may include peripheral user data included in the required second portion of submission data. It should be noted that depending on the algorithm used, the required portions of submission data may refer to the underlying values or the categories of values. For example, in some embodiments, verification of the required portion of submission data may include validating that a required category of data has been received. That is, the verification may require ensuring that a required field is populated with a data value. Alternatively or additionally, the verification of the required portion of submission data may include validating both the presence of data value, and also the accuracy of the data value. For example, the verification step performed by primary device 104, peripheral device 102, and/or server 106 may include verifying that a value in the social security number field is the correct social security number of a user associated with the portion of submission data.

The required second portion of submission data may also be segmented into sensitive data associated with the peripheral user and non-sensitive data associated with the peripheral user. For example, as shown in FIG. 2, peripheral device 102 has received sensitive data 120 and non-sensitive data 118. In some embodiments, the sensitivity of this data may differ depending on the particular user. For example, the designation of sensitive data 120 as sensitive may have come from a user operating peripheral device 102. Because of this, the system may tag the sensitive data in one or more ways to designate to whom this data is sensitive, what device can receive, what device can display, what device may modify, etc. By segmenting the data (or categories of data), and tagging the data (or categories of data) in this manner, the devices may participate in a joint submission while ensuring both the security of the data and privacy of the users to third-parties (whether authorized or unauthorized) and each other. For example, as shown in FIG. 2, sensitive data 120 is not displayed on primary device 104 (although non-sensitive data 118 is displayed).

As shown in FIG. 2, the sensitive data associated with the peripheral user may not be viewable by primary device 104 but may still be receivable by the primary device (e.g., for incorporation into the joint submission). For example, while sensitive data 120 may have been received by primary device 104, it is not necessarily viewable and/or accessible by a user of primary device 104. Likewise, non-sensitive data 118 is both receivable and viewable by primary device 102 as shown in FIG. 2. For example, primary device 104 has used non-sensitive data 118 to generate notification 116 on primary device 104. Notably, because sensitive data 120 is not accessible and/or viewable by a user operating primary device 104, sensitive data 120 is not used for generating notification 116. Additionally, a user operating primary device 104 could not view and/or access this data while reviewing the joint submission or data relating to the joint submission received from peripheral device 102. That is, while the required second portion of submission data may be stored on primary device 104, the joint submission application or encryption scheme prevents a user from accessing sensitive data 120 from primary device 104.

Primary device 104 may then receive primary user data from the primary user. For example, primary device 104 may receive data inputted by the primary user into a user input interface of primary device 104. For example, as shown in FIG. 2, primary device 104 is a touchscreen smartphone and thus primary device 104 may receive user inputs via the touchscreen display. Alternatively or additionally, primary device 104 may retrieve information about the primary user from a user profile of the primary user. For example, as part of the joint submission process, the users of primary device 104 and peripheral device 102 may have (or be required to create) user profiles. These user profiles may be linked to a user account for the respective user of the service provider of the joint submission application (or the service provider to which the joint submission is to be submitted). Primary device 140, peripheral device 102, and/or server 106 may access this profile and/or account to retrieve data to complete the joint submission. For example, using the user profile and/or user account for each respective user, the joint submission application may autofill the respective portions of required submission data to create the respective submission packages.

Primary device 104 may then verify that the primary user data includes the required first portion of submission data. For example, in order to facilitate the joint submission in which the receipt of, and/or ability to view, the data may be limited by its sensitivity, primary device 104 may verify that the primary user data includes the required first portion. Likewise, peripheral device 102 may verify that the peripheral user data includes the required second portion of submission data. Alternatively or additionally, each device may self-verify or off-load this operation to a third-party and/or other authorized entity (e.g., server 106).

Primary device 104 may then generate a first submission package for primary device 104. The first submission package may include the required first portion of submission data included in the first data, and the first submission package may be combined (e.g., either at primary device 104 or at server 106) with the second submission package to create a joint submission package. Primary device 104 may then submit (or initiate the submission if the joint submission package is already stored at server 106) the joint submission package.

In some embodiments, primary device 104 may generate a notification (e.g., similar to notification 116) for peripheral device 102 that indicates that the second submission package has been received. This notification may include non-sensitive data associated with the primary user (e.g., the name of the primary user) and may be transmitted to peripheral device 102. Additionally, this notification may end the temporary device session. Alternatively, the temporary device session may be ended by the primary device upon receipt of the second portion of submission data (e.g., simultaneously with the generation of notification 116) or upon submission of the joint submission package. Notably, if the temporary device session needs to be re-opened (e.g., in order to receive modification to the second submission package from peripheral device 106) or a new temporary device session needs to be created, primary device 104 may generate a new QR code as discussed above. This QR code may contain the same information as the previous QR code and/or additional information that adds or restricts the actions of the temporary device session.

In some embodiments, primary device 104 may be further configured to aggregate data in corresponding categories of the first submission package and the second submission package. For example, the joint submission may require data entered by the primary and peripheral user to be aggregated. If this data is sensitive (and thus not accessible and/or viewable) by the other user, this operation may not be possible unless the data needed to be aggregated has been previously segmented and/or tagged. Accordingly, peripheral device 102 (or server 106) may segment the sensitive data associated with the peripheral user into a first portion of sensitive data associated with the peripheral user and a second portion of sensitive data associated with the peripheral user, in which the first portion of sensitive data associated with the peripheral user is in a category of sensitive data that requires its values to be aggregated with values of sensitive data associated with the primary user in a respective category, and in which the second portion of sensitive data associated with the peripheral user is in a category of sensitive data that does not require its values to be aggregated with values of sensitive data associated with the primary user in a respective category.

Additionally or alternatively, the joint submission application (or peripheral device 102) may encrypt the tags and/or data needing to be aggregated differently than other data. For example, primary device 104 may have the encryption key for the encryption of the tags and use it to decrypt the tags, while the underlying data remains encrypted. With the tags decrypted, primary device 104 may identify the data that needs to be aggregated.

After primary device 104 identifies (e.g., based on tags) the first portion of sensitive data associated with the peripheral user and the second portion of sensitive data associated with the peripheral user, primary device 104 may process the underlying values. In response to identifying sensitive data associated with the peripheral user in the first portion of sensitive data associated with the peripheral user, primary device 104 (or server 106) may aggregate a value of the first portion of sensitive data with a value of sensitive data associated with the primary user. Processing these values to perform the aggregation may include further decryption and/or may involve other security protocols (e.g., transmitting the data to server 106 and/or submitting the joint submission package with a notification to aggregate data prior to finalizing the submission) to ensure that the sensitive data is not accessible to the user of primary device 104. Notably, even if underlying data is decrypted, the tags still prevent the values of the sensitive data from being displayed on the primary device.

Figure 3:
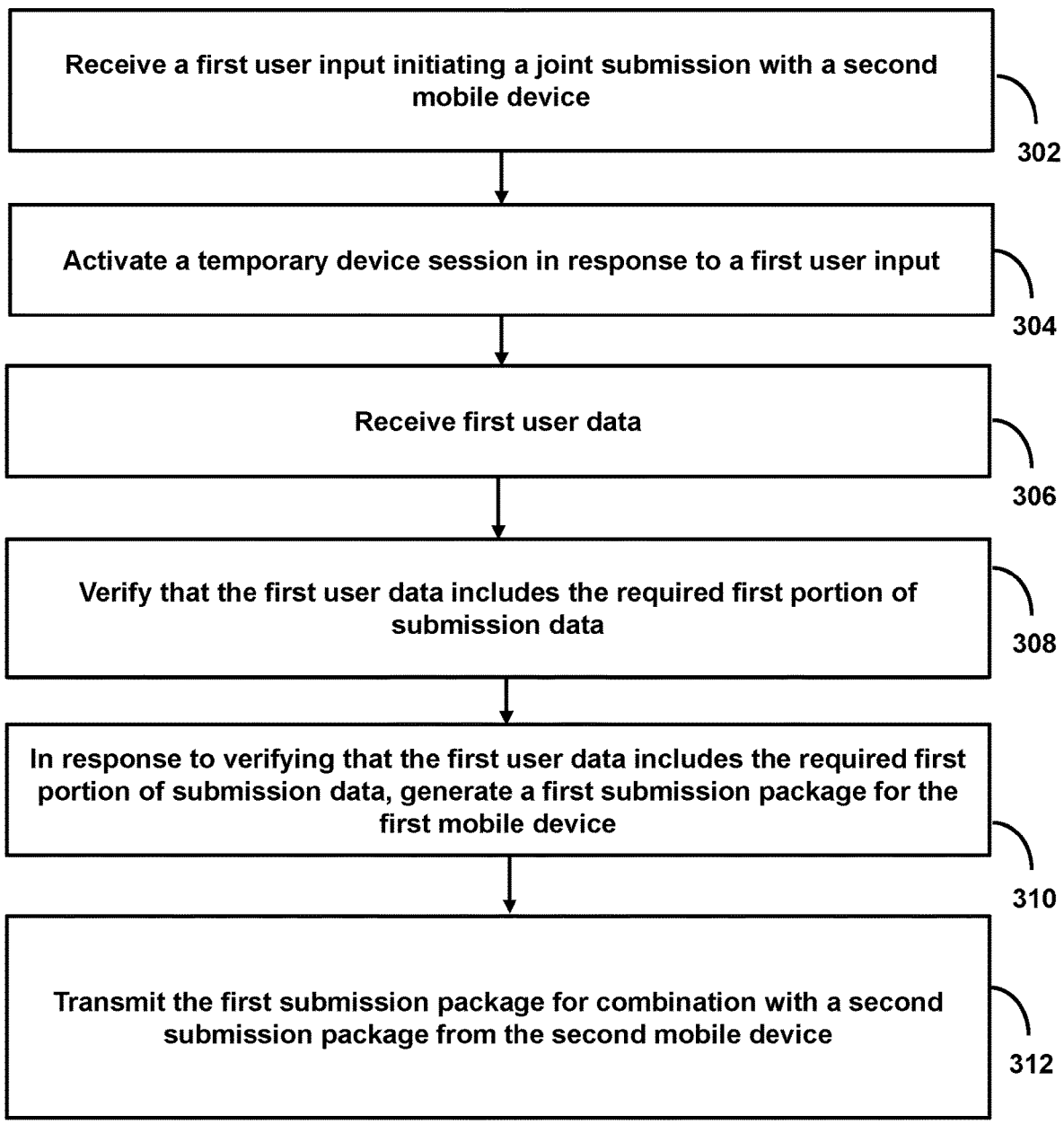
FIG. 3 shows a flowchart for transmitting a submission package for combination with another submission package, in accordance with one or more embodiments.

FIG. 3 shows a flowchart for transmitting a submission package for combination with another submission package, in accordance with one or more embodiments. For example, process 300 may represent the steps taken by peripheral device 102 (FIG. 1) to receive data from the user operating peripheral device 102 (FIG. 1) and transmit a submission package of that data to primary device 104 (FIG. 1).

At step 302, a first mobile device (e.g., peripheral device 102 (FIG. 1)) receives a first user input initiating a joint submission (e.g., a marriage certificate application for two people) with a second mobile device (e.g., primary device 104 (FIG. 1)). For example, the first mobile device may be associated with a user profile for a first user (e.g., a user profile established for the first person with a local government) and the second mobile device is associated with a user profile for a second user (e.g., a user profile established for the second person with the local government). The joint submission may require a first portion of submission data associated with the first user and a second portion of submission data associated with the second user. For example, the joint submission may require a name, current address, previous address, social security number, height, weight, known alias, etc. To speed up the process of filling out the information for the joint submission, the two people may initiate a joint submission through the use of a joint submission application operating on the first and second mobile devices.

At step 304, the first mobile device (e.g., peripheral device 102 (FIG. 1) activates a temporary device session in response to a first user input. For example, the first user input may have been the selection of a link on a webpage which opens the joint submission application, a selection of a joint submission application icon on the mobile device, or may have been a link in an electronic communication received from another device (e.g., primary device 104 (FIG. 1)). In response to the first user input, a temporary device session is activated. In some embodiments, as described in FIG. 5 below, the mobile device's additional security measures may be introduced (e.g., the user of QR code).

At step 306, the first mobile device (e.g., peripheral device 102 (FIG. 1)) receives first user data. For example, while the temporary device session is active, a user operating the first mobile device may input first user data into the first mobile device. This data (or the categories of this data) may correspond to at least the first portion of submission data. Additionally or alternatively, the first mobile device may retrieve first user data automatically (e.g., from the user profile established for the first user).

At step 308, the first mobile device verifies that the first user data includes the required first portion of submission data. For example, the first mobile device may verify that the data about the first user that is required to complete the first submission has been entered. This step may include verifying that the first user has entered values into required fields. Additionally or alternatively, this step may include verifying that a value (e.g., a value entered for the name of the first user) is correct. For example, the first mobile device may compare the name entered by the first user to the name of the first user in the user profile. Additionally or alternatively, the first mobile device may compare the name entered by the first user to a name of the first user entered by a user on the other device (e.g., primary device 104 (FIG. 1)) when the joint submission was being initiated. The first mobile device may then segment the required first portion of submission data into sensitive data associated with the first user and non-sensitive data associated with the first user. For example, the first user may indicate that data related to weight is sensitive and therefore not want the other user to be able to view this data. Additionally or alternatively, the joint submission application may determine that the social security number is personally identifiable information and therefore automatically designate this information as sensitive. Other data (e.g., the name of the first user) may be designated as non-sensitive by the first user, joint submission application, etc. It should be noted that in some embodiments, the verification of data may occur remotely (e.g., as server 106 (FIG. 1)). In such embodiments, the first mobile device transmits data for verification to the remote device. Alternatively or additionally, the first mobile device may activate another temporary device session between the first mobile device (e.g., peripheral device 102 (FIG. 1)) and the remote device (e.g., server 106 (FIG. 1)) along another communication path (e.g., communication path 108 (FIG. 1)).

At step 310, the first mobile device generates a first submission package for the first mobile device in response to verifying that the first user data includes the required first portion of submission data. For example, in response to verifying that the first user data includes the required first portion of submission data, the first mobile device (e.g., peripheral device 102 (FIG. 1)) creates the first submission package with the required first portion of submission data. Once the first submission package is created, the sensitive data associated with the first user (e.g., sensitive data 120 (FIG. 2)) is not viewable by the second mobile device (although it may still be receivable and/or accessible by the joint submission application), whereas the non-sensitive data associated with the first user (e.g., non-sensitive data 118 (FIG. 2)) may be viewable by the second mobile device (and still receivable and/or accessible by the joint submission application).

At step 312, the first mobile device transmits the first submission package for combination with a second submission package for the second mobile device. For example, the second submission package may include the required second portion of submission data. Therefore, upon combination of the first and second submission packages, the joint submission is complete. In some embodiments, the second mobile device (e.g., primary device 104 (FIG. 1)) may generate the second submission packages via steps 306-310 on the second mobile device and/or a remote device (e.g., server 106 (FIG. 1)).

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 3.

Figure 4:
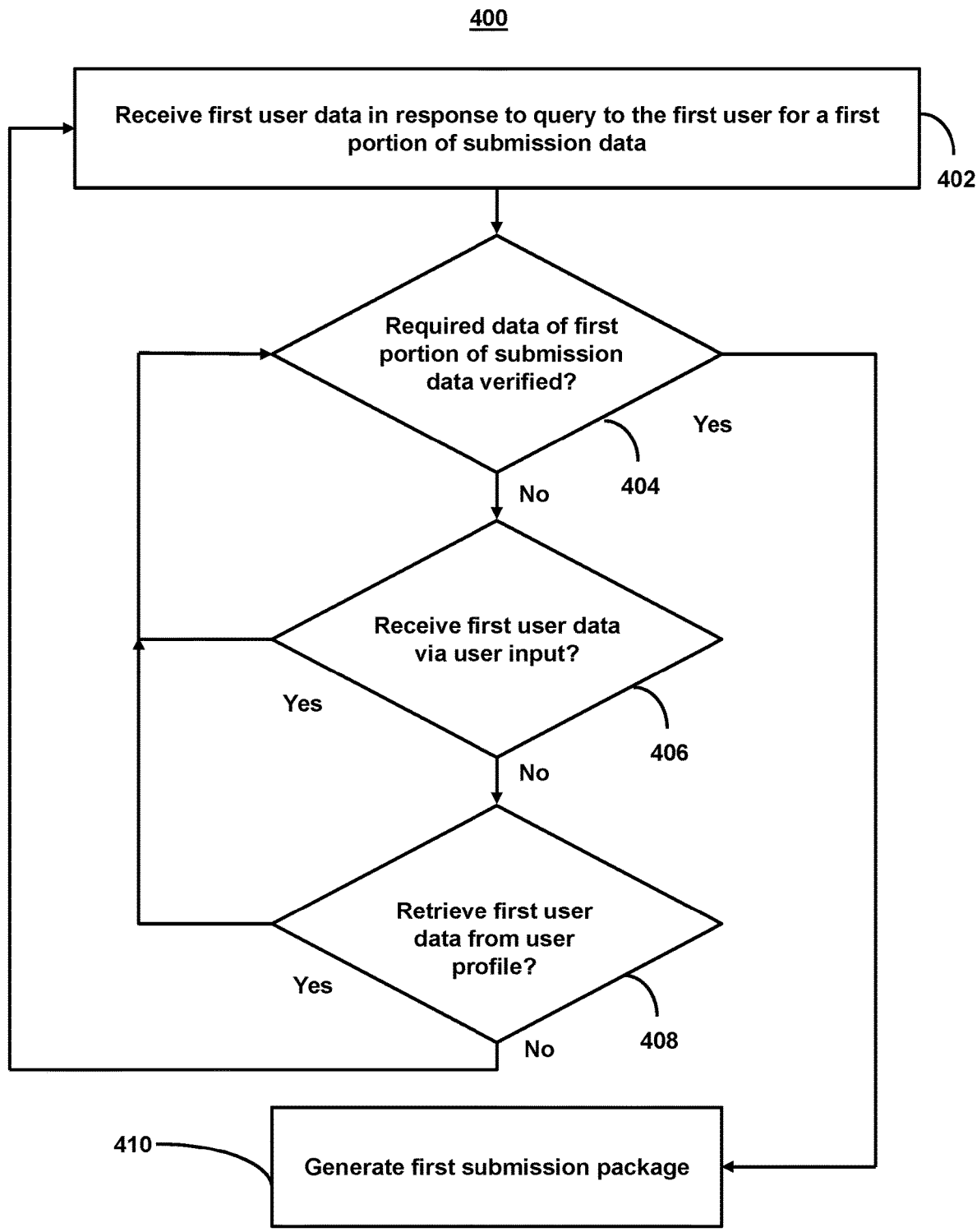
FIG. 4 shows a flowchart for generating a submission package for a user device, in accordance with one or more embodiments.

FIG. 4 shows a flowchart for generating a submission package for a mobile device, in accordance with one or more embodiments. For example, process 400 may represent the steps taken by peripheral device 102 (FIG. 1) to receive data from the user operating peripheral device 102 (FIG. 1).

At step 402, the first mobile device (e.g., peripheral device 102 (FIG. 1)) receives first user data in response to a query to the first user for a first portion of submission data. For example, the query may appear as a notification on the first mobile device or a form with various fields requiring data input. In some embodiments, the fields for the required data (i.e., data necessary to complete the first portion of submission data and/or data in a category of the first portion of submission data) may be highlighted as required. Additionally, the first user may be able to designate the types of data, or the data itself, that is sensitive and/or non-sensitive (as well as to whom the data is sensitive).

At step 404, the first mobile device verifies whether or not the received first user data includes all of the data needed for the first portion of the submission data. If so, process 400 continues to step 410 to generate the first submission package. If not, process 400 continues to step 406. For example, until the receipt of the first portion of the submission data is complete, the first mobile device may remain on a data input page or continually query a server (e.g., server 106 (FIG. 1)) for user data.

At step 406, the first mobile device determines whether or not it has received first user data via a user input. For example, the first mobile device (e.g., peripheral device 102 (FIG. 1)) may allow a user to manually enter the first user data. The manual entry may be through the use of a touchscreen (as in the case of a touchscreen mobile device) or other suitable input means. If the first mobile device determines that first user data has been received via user input, process 400 returns to step 404 to determine whether the received first user data includes all of the data needed for the first portion of the submission data. If the first mobile device determines that first user data has been received via user input, process 400 continues to step 408.

At step 408, the first mobile device determines whether or not it has received first user data from a user profile. For example, the first mobile device (e.g., peripheral device 102 (FIG. 1)) may automatically pull the first user data from one or more user profiles of the first user. The first mobile device may perform the data pull automatically or require the user to log into a user account. If the first mobile device determines that first user data has been received via the user profile, process 400 returns to step 404 to determine whether the received first user data includes all of the data needed for the first portion of the submission data. If the first mobile device determines that first user data has not been received via the user profile, process 400 returns to step 402 to query the first user.

At step 410, the first mobile device generates the first submission package. For example, in response to verifying that the received first user data includes all of the data needed for the first portion of the submission data at step 402, process 400 proceeds to step 410.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one of more of the steps in FIG. 4.

Figure 5:
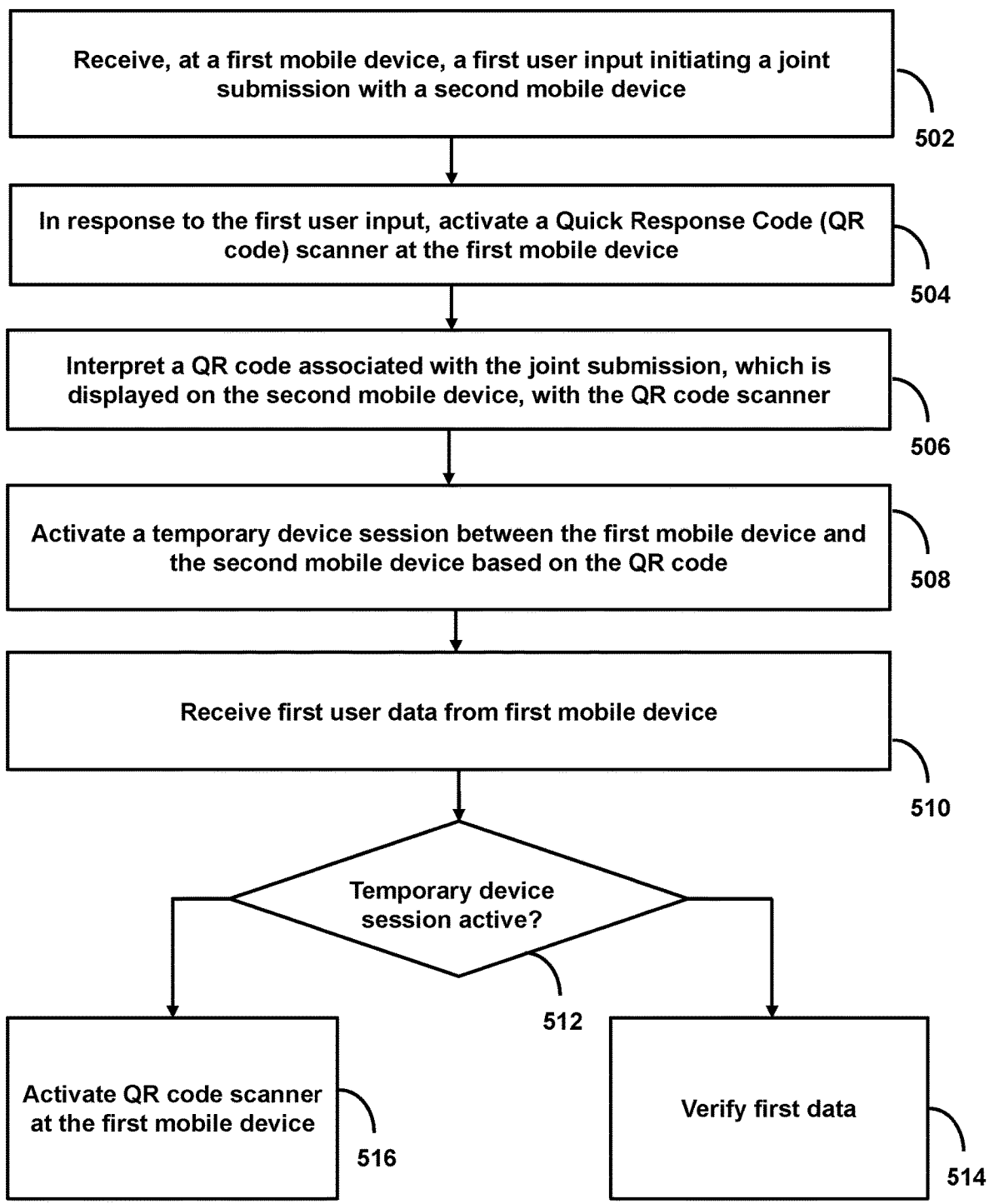
FIG. 5 shows a flowchart of the steps involved in activating a temporary device session using QR codes, in accordance with one or more embodiments.

FIG. 5 shows a flowchart of the steps involved in initiating a temporary device session using QR codes, in accordance with one or more embodiments. For example, FIG. 5 may correspond to the temporary device session established between a first mobile device (e.g., primary device 104 (FIG. 1)) and a second mobile device (e.g., peripheral device 102 (FIG. 1)) along communication path 112 (FIG. 1).

At step 502, a first mobile device (e.g., peripheral device 102 (FIG. 1)) receives a first user input initiating a joint submission (e.g., a sublease agreement) with a second mobile device (e.g., primary device 104 (FIG. 1)). For example, the first mobile device may be associated with a user profile for a first user (e.g., a sub-lessor) and the second mobile device is associated with a user profile for a second user (e.g., a user profile established for the sub-lessor with the lessor). The joint submission may require a first portion of submission data associated with the first user and a second portion of submission data associated with the second user. For example, the joint submission may require a name, current address, previous address, social security number, etc.

At step 504, the first mobile device activates a Quick Response Code (QR code) scanner at the first mobile device in response to the first user input. For example, in order to initiate a temporary device session to share data securely between the first and second mobile device, the first mobile device may be required to scan a QR code displayed on the first mobile device.

At step 506, the first mobile device interprets a QR code associated with the joint submission, which is displayed on the second mobile device, with the QR code scanner. For example, the QR code (or another suitable alphanumeric, matrix-based, or other code based scheme) may display a QR code (e.g., QR code 114 (FIG. 1)) that can be converted into a useful form by the first mobile device.

At step 508, the first mobile device activates a temporary device session between the first mobile device and the second mobile device based on the QR code. For example, while the temporary device session is active, the first mobile device and second mobile device may share information related to the joint submission. Additionally, the first mobile device and second mobile device may gain access to other devices (e.g., server 106 (FIG. 1)). For example, while a temporary device session is active, the first mobile device and second mobile device may be able to securely transfer encrypted data (e.g., the respective submission packages and/or other data) between each other and/or other devices.

At step 510, the first mobile device receives first user data from the first mobile device. For example, the first user data may be for a first portion of submission data, which is needed to generate a first submission package. In another example, the first mobile device may receive, a second user input modifying the first user data after transmitting the first submission package for combination with a second submission package. For example, after the first user transmits the first submission package, the first user may wish to modify some data. The first mobile device then generates a modified first submission package for transmitting to the second mobile device (e.g., primary device 104 (FIG. 1) of server 106 (FIG. 1)).

At step 512, the first mobile device determines whether the temporary device session is active. For example, the first mobile device may test the connection and/or ping the first mobile device or another device. In response to determining that the temporary device session is active, process 500 continues to step 514 and verifies the first data. In response to determining that the temporary device session is not active, process 500 continues to step 516 and activates the QR code scanner at the first mobile device to interpret a new QR code associated with the joint submission that will re-activate the temporary device session. In some embodiments, either the first or second user may additionally or alternatively input data into their respective devices to re-activate the temporary device session. For example, in response to interpreting a new QR code (or receiving a confirmation that the QR code has been received and/or accepted), the first and/or second mobile device may query its respective users regarding re-activating the temporary device session. This query may introduce an additional security measure (e.g., a request for a joint submission or temporary device session password).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one of more of the steps in FIG. 5.

Figure 6:
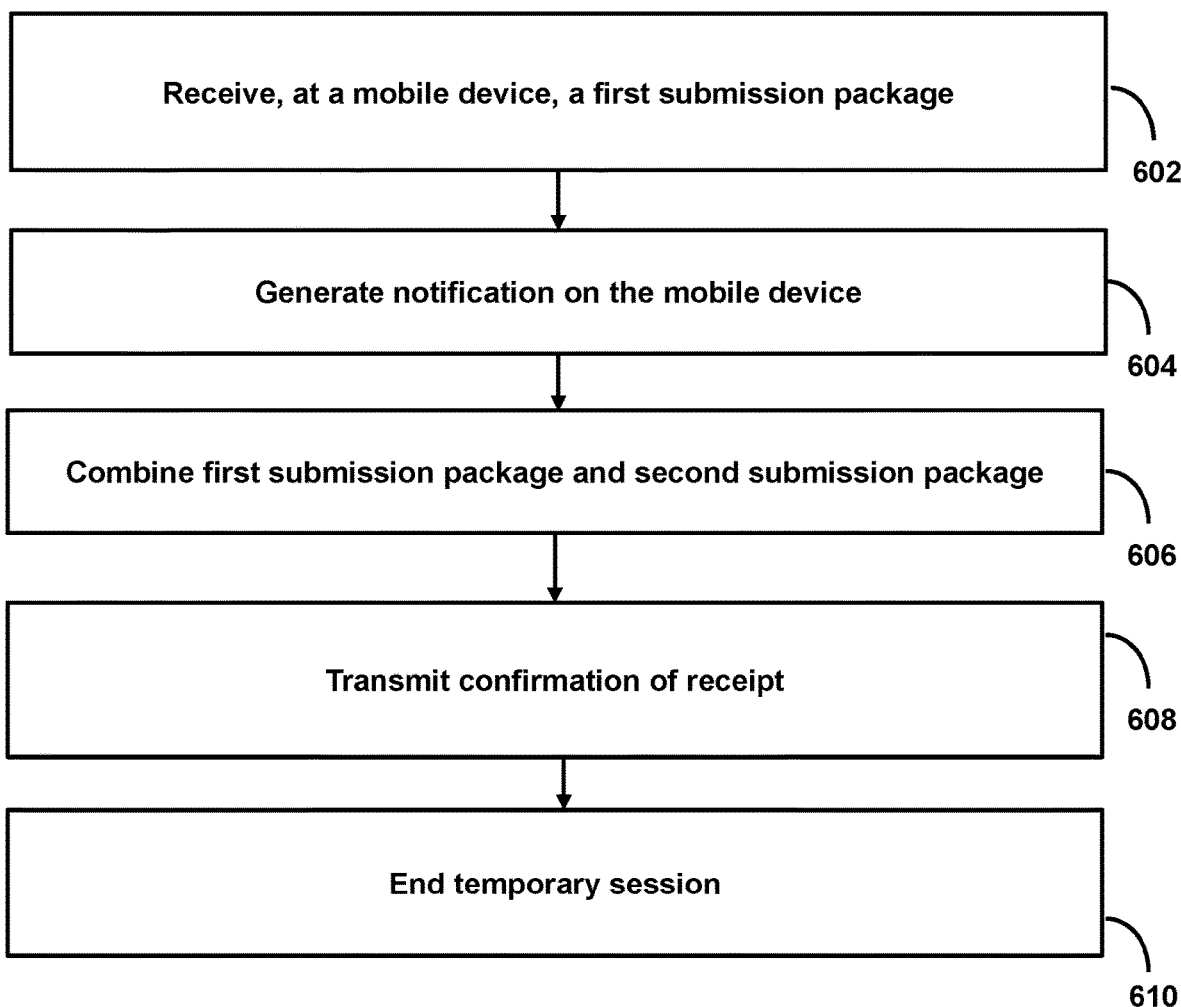
FIG. 6 shows a flowchart of the steps involved in initiating a joint submission using a QR code, in accordance with one or more embodiments.

FIG. 6 shows a flowchart of the steps involved in initiating a joint submission using a QR code, in accordance with one or more embodiments. For example, process 600 may represent the steps taken by primary device 104 (FIG. 1) upon receiving a submission package from aperipheral device 102 (FIG. 1).

At step 602, a mobile device (e.g., primary device 104 (FIG. 1)) receives a first submission package. For example, the first submission package may correspond to a submission package as generated using one or more of the steps of process 400 (FIG. 4). For example, the first submission package may have been generated by, and/or received from, another device (e.g., peripheral device 102 (FIG. 1) or server 106 (FIG. 1)).

At step 604, the mobile device generates a notification to be displayed on the mobile device that indicates that the first submission package has been received. For example, the notification may correspond to notification 116 (FIG. 2) and may provide textual, video, and/or audio data indicating that the submission package has been received. The notification may further include a portion of non-sensitive data associated with another user. For example, the notification may include non-sensitive data (e.g., non-sensitive data 118 (FIG. 2)). The non-sensitive data may include information regarding from whom or from where the submission package was received, status information regarding the joint submission, or may otherwise incorporate non-sensitive data about the other user into a message.

At step 606, the mobile device combines the first submission package and a second submission package into the joint submission. For example, the mobile device (e.g., primary device 104 (FIG. 1)) may combine the submission package received from the other device (or multiple submission packages received from multiple devices) into a joint submission package. For example, in some embodiments, the mobile device may receive one or more submission packages from multiple different devices. In some embodiments, the mobile device may directly combine the submission packages (e.g., using applications or components resident on the mobile device) or the mobile devices may transmit the submission packages to another device (e.g., server 106 (FIG. 1)) for combination. For example, the first submission package and/or the second submission package may be transmitted (e.g., by the mobile device) to a server (e.g., server 106 (FIG. 1)) for combination while the temporary device session is active. For example, in some embodiments, the first submission package is stored at the server prior to the first submission package and the second submission package being combined.

At step 608, the mobile device transmits a confirmation of the receipt. This confirmation may be transmitted to the device from which the submission package was received (e.g., peripheral device 102 (FIG. 1)) and/or another device (e.g., server 106 (FIG. 1)). For example, the confirmation of receipt, in addition or alternative to, alerting a user operating another device (e.g., peripheral device 106 (FIG. 1)) that the submission package has been received may also include instructions for the joint submission application running on that device. For example, the confirmation may cause the other device to perform additional functions and/or close the joint submission application running on that device.

At step 610, the mobile device ends the temporary device session. For example, the mobile device may end the temporary device session that is active along communication paths 108, 110, and/of 112 (FIG. 1). In some embodiments, the temporary device session may end upon the transmission and/or receipt of the confirmation of step 608. For example, upon transmitting the confirmation, the mobile device may close the temporary device session. Likewise, upon receipt of the confirmation, the other device may close the temporary device session (if it is still active). In some embodiments, the mobile device may end the temporary device session upon receipt of a portion of submission data from another device (e.g., peripheral device 102 (FIG. 1) and/or server 106 (FIG. 1)) or upon submission of the joint submission package (e.g., to server 106 (FIG. 1)).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one of more of the steps in FIG. 6.

The above-described example embodiments are presented for purposes of example and not of limitation, and the present disclosure is limited only by the claims which follow. Furthermore, it should be noted that features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

Additional example embodiments include:

1. A method comprising: receiving, at a first user device, a first user input initiating a joint submission with a second user device, wherein the first user device is associated with a user profile for a first user and the second user device is associated with a user profile for a second user, and wherein the joint submission requires a first portion of submission data associated with the first user and a second portion of submission data associated with the second user; in response to the first user input, activating a temporary device session; and while the temporary device session is active: receiving first user data; verifying that the first user data includes the required first portion of submission data, wherein the required first portion of submission data includes sensitive data associated with the first user and non-sensitive data associated with the first user; generating a first submission package, wherein the first submission package includes the required first portion of submission data included in the first user data, and wherein the sensitive data associated with the first user is not viewable by the second user device, and wherein non-sensitive data associated with the first user is viewable by the second user device; and transmitting the first submission package for combination with a second submission package that includes the required second portion of submission data.

2. The method of embodiment 1, wherein receiving the first user data comprises: retrieving a first portion of the first user data from the user profile for the first user; and receiving a second portion of the first user data through user inputs entered at the first user device.

3. The method of embodiment 1 or 2, further comprising: segmenting the sensitive data associated with the first user into a first portion and a second portion of sensitive data, wherein the first portion of sensitive data is in a category of sensitive data that requires values of said first portion of sensitive data to be aggregated with values of sensitive data associated with the second user in a respective category, and wherein the second portion of sensitive data is in a category of sensitive data that does not require its values to be aggregated with values of sensitive data associated with the second user in a respective category.

4. The method of any one of embodiments 1-3, wherein the first submission package and the second submission package are combined into a final submission package, and wherein the final submission package is submitted to a server.

5. The method of any one of embodiments 1-4, further comprising tagging, at the first user device, the sensitive data associated with the first user as receivable but not viewable by the second user device.

6. The method of any one of embodiments 1-5, wherein activating the temporary device session comprises: activating a Quick Response Code (QR code) scanner at the first user device; scanning a QR code associated with the joint submission, which is displayed on the second user device, with the QR code scanner; and activating a temporary session between the first user device and the second user device.

7. The method of any one of embodiments 1-6, wherein receipt of the first submission package by the second user device causes: a notification to be displayed on the second user device that indicates that the first submission package has been received, wherein the notification includes a portion of the non-sensitive data associated with the first user.

8. The method of any one of embodiments 1-7, wherein the first submission package is transmitted to a server for combination with the second submission package while the temporary device session is active, and wherein the first submission package is stored prior to the first submission package and the second submission package being combined.

9. The method of any one of embodiments 1-8, further comprising: receiving, at the first user device, a second user input modifying the first user data after transmitting the first submission package for combination with a second submission package; determining whether the temporary device session is active; and in response to determining that the temporary device session is active, generating a modified first submission package and transmitting the modified first submission package.

10. The method of any one of embodiments 1-8, further comprising: receiving, at the first user device, a second user input modifying the first user data after transmitting the first submission package for combination with a second submission package; determining whether the temporary device session is active; and in response to determining that the temporary device session is not active, activating the QR code scanner at the first user device to interpret a new QR code associated with the joint submission that will re-activate the temporary device session.

10. A tangible, non-transitory, machine-readable medium storing instructions that, when executed by a data processing apparatus, cause the data processing apparatus to perform operations comprising those of any of embodiments 1-10.

11. A system comprising: one or more processors; and memory storing instructions that, when executed by the processors, cause the processors to effectuate operations comprising those of any of embodiments 1-10.

What is claimed is:

1. A system for facilitating joint submissions, comprising a primary device including a memory and processor configured to:
receive a first user input initiating a joint submission with a peripheral device, wherein the primary device is associated with a user profile for a primary user and the peripheral device is associated with a user profile for a peripheral user, and wherein the joint submission requires a first portion of submission data associated with the primary user and a second portion of submission data associated with the peripheral user;
in response to the first user input, generate for display a Quick Response Code (QR code) at the primary device, wherein the QR code is displayed for the peripheral device to scan it to join a temporary device session;
activate the temporary device session between the primary device and the peripheral device;
while the temporary device session is active, receive a submission package from the peripheral device, wherein:
the submission package includes the required second portion of submission data,
the required second portion of submission data includes Personally Identifiable Information (PII) associated with the peripheral user and non-PII associated with the peripheral user,
the PII associated with the peripheral user is not viewable by the primary device, and
the non-PII associated with the peripheral user is viewable by the primary device;
receive the required first portion of submission data;
generate a joint submission package, wherein the joint submission package includes the required first portion of submission data and the required second portion of submission data; and
submit the joint submission package.

2. The system of claim 1, wherein the primary device is further configured to:
generate a notification for the peripheral device that indicates that the submission package has been received, wherein the notification includes non-PII associated with the primary user; and
transmit the notification to the peripheral device.

3. The system of claim 1, wherein the primary device is further configured to end the temporary device session after receipt of the submission package from the peripheral device or after submission of the joint submission package.

4. The system of claim 1, wherein the required second portion of submission data is transmitted to a server prior to generating the joint submission package, and wherein the required first portion of submission data is stored at the server prior to generating the joint submission package.

5. The system of claim 1, wherein the primary device is further configured to:
identify a first portion of PII and a second portion of PII of the PII associated with the peripheral user, wherein the first portion of PII is in a category of PII that requires values of said first portion of PII to be aggregated with values of PII associated with the primary user in a respective category, and wherein the second portion of PII is in a category of PII that does not require its values to be aggregated with values of PII associated with the primary user in a respective category; and
aggregate a value of the first portion of PII with a value of PII associated with the primary user.

6. The system of claim 1, wherein receiving the required first portion of submission data comprises:
retrieving a first portion of the required first portion of submission data from the user profile for the primary user; and
receiving a second portion of the required first portion of submission data through user inputs entered at the primary device.

7. A method for facilitating joint submissions, the method comprising:
receiving, at a primary device, a first user input initiating a joint submission with a peripheral device, wherein the primary device is associated with a user profile for a primary user and the peripheral device is associated with a user profile for a peripheral user, and wherein the joint submission requires a first portion of submission data associated with the primary user and a second portion of submission data associated with the peripheral user;

receiving, at the primary device, a submission package from the peripheral device, wherein:
the submission package includes the required second portion of submission data,
the required second portion of submission data includes Personally Identifiable Information (PII) associated with the peripheral user and non-PII associated with the peripheral user,
the PII associated with the peripheral user is not viewable by the primary device, and
the non-PII associated with the peripheral user is viewable by the primary device;

receiving, at the primary device, the required first portion of submission data; and generating, at the primary device, a joint submission package, wherein the joint submission package includes the required first portion of submission data and the required second portion of submission data.

8. The method of claim 7, further comprising:
generating, at the primary device, a notification for the peripheral device that indicates that the submission package has been received, wherein the notification includes non-PII associated with the primary user; and
transmitting the notification to the peripheral device.

9. The method of claim 7, further comprising ending a temporary device session after receipt of the submission package from the peripheral device or after submission of the joint submission package.

10. The method of claim 7, wherein the required second portion of submission data is transmitted to a server prior to generating the joint submission package, and wherein the required first portion of submission data is stored at the server prior to generating the joint submission package.

11. The method of claim 7, further comprising:
identifying a first portion of PII and a second portion of PII of the PII associated with the peripheral user, wherein the first portion of PII is in a category of PII that requires values of said first portion of PII to be aggregated with values of PII associated with the primary user in a respective category, and wherein the second portion of PII is in a category of PII that does not require its values to be aggregated with values of PII associated with the primary user in a respective category; and
aggregating a value of the first portion of PII with a value of PII associated with the primary user.

12. The method of claim 7, wherein receiving the required first portion of submission data comprises:
retrieving a first portion of the required first portion of submission data from the user profile for the primary user; and
receiving a second portion of the required first portion of submission data through user inputs entered at the primary device.

13. A method for facilitating joint submissions, the method comprising:
receiving, at a first mobile device, a first user input initiating a joint submission with a second mobile device, wherein the first mobile device is associated with a user profile for a first user and the second mobile device is associated with a user profile for a second user, and wherein the joint submission requires a first portion of submission data associated with the first user and a second portion of submission data associated with the second user;
receiving first user data;
verifying that the first user data includes the required first portion of submission data, wherein the required first portion of submission data includes Personally Identifiable Information (PII) associated with the first user and non-PII associated with the first user;
generating a first submission package, wherein the first submission package includes the required first portion of submission data included in the first user data, and wherein the PII associated with the first user is not viewable by the second mobile device, and wherein non-PII associated with the first user is viewable by the second mobile device; and
transmitting the first submission package for combination with a second submission package that includes the required second portion of submission data.

14. The method of claim 13, wherein receiving the first user data comprises:
retrieving a first portion of the first user data from the user profile for the first user; and
receiving a second portion of the first user data through user inputs entered at the first mobile device.

15. The method of claim 13, further comprising:
segmenting the PII associated with the first user into a first portion of PII and a second portion of PII, wherein the first portion of PII is in a category of PII that requires values of said first portion of PII to be aggregated with values of PII associated with the second user in a respective category, and wherein the second portion of PII is in a category of PII that does not require its values to be aggregated with values of PII associated with the second user in a respective category.

16. The method of claim 13, wherein the first submission package and the second submission package are combined into a final submission package, and wherein the final submission package is submitted to a server.

17. The method of claim 13, further comprising tagging, at the first mobile device, the PII associated with the first user as receivable but not viewable by the second mobile device.

18. The method of claim 13, further comprising activating a temporary device session by:
activating a Quick Response Code (QR code) scanner at the first mobile device;
scanning a QR code associated with the joint submission, which is displayed on the second mobile device, with the QR code scanner; and
activating a temporary session between the first mobile device and the second mobile device.

19. The method of claim 13, wherein receipt of the first submission package by the second mobile device causes:
a notification to be displayed on the second mobile device that indicates that the first submission package has been received, wherein the notification includes a portion of the non-PII associated with the first user.

20. The method of claim 13, wherein the first submission package is transmitted to a server for combination with the second submission package while a temporary device session is active, and wherein the first submission package is stored prior to the first submission package and the second submission package being combined.

21. The method of claim 13, further comprising:
receiving, at the first mobile device, a second user input modifying the first user data after transmitting the first submission package for combination with a second submission package;
determining whether a temporary device session is active; and
in response to determining that the temporary device session is active, generating a modified first submission package and transmitting the modified first submission package.

22. A non-transitory computer-readable media comprising instructions that, when executed by one or more processors, cause operations comprising:
receiving, at a first mobile device, a first user input initiating a joint submission with a second mobile device, wherein the first mobile device is associated with a user profile for a first user and the second mobile device is associated with a user profile for a second user, and wherein the joint submission requires a first portion of submission data associated with the first user and a second portion of submission data associated with the second user;
receiving first user data;
verifying that the first user data includes the required first portion of submission data, wherein the required first portion of submission data includes Personally Identifiable Information (PII) associated with the first user and non-PII associated with the first user;
generating a first submission package, wherein the first submission package includes the required first portion of submission data included in the first user data, and wherein the PII associated with the first user is not viewable by the second mobile device, and wherein non-PII associated with the first user is viewable by the second mobile device; and
transmitting the first submission package for combination with a second submission package that includes the required second portion of submission data.

23. The non-transitory computer-readable media of claim 22, wherein receiving the first user data comprises:
retrieving a first portion of the first user data from the user profile for the first user; and
receiving a second portion of the first user data through user inputs entered at the first mobile device.

24. The non-transitory computer-readable media of claim 22, the operations further comprising:
segmenting the PII associated with the first user into a first portion of PII and a second portion of PII, wherein the first portion of PII is in a category of PII that requires values of said first portion of PII to be aggregated with values of PII associated with the second user in a respective category, and wherein the second portion of PII is in a category of PII that does not require its values to be aggregated with values of PII associated with the second user in a respective category.

25. The non-transitory computer-readable media of claim 22, wherein the first submission package and the second submission package are combined into a final submission package, and wherein the final submission package is submitted to a server in response to a submission request entered at the second mobile device.

26. The non-transitory computer-readable media of claim 22, further comprising activating a temporary device session by:
activating a Quick Response Code (QR code) scanner at the first mobile device;
scanning a QR code associated with the joint submission, which is displayed on the second mobile device, with the QR code scanner; and
activating a temporary session between the first mobile device and the second mobile device.

27. The non-transitory computer-readable media of claim 22, wherein receipt of the first submission package by the second mobile device causes:
a notification to be displayed on the second mobile device that indicates that the first submission package has been received, wherein the notification includes a portion of the non-PII associated with the first user.

28. The non-transitory computer-readable media of claim 22, wherein the first submission package is transmitted to a server for combination with the second submission package while a temporary device session is active, wherein the first submission package is stored prior to the first submission package and the second submission package being combined.

29. The non-transitory computer-readable media of claim 22, the operations further comprising:
receiving, at the first mobile device, a second user input modifying the first user data after transmitting the first submission package for combination with a second submission package;
determining whether a temporary device session is active;
in response to determining that the temporary device session is active, generating a modified first submission package and transmitting the modified first submission package.

* * * * *